United States Patent
Riccio

[19]

[11] Patent Number: 5,974,952
[45] Date of Patent: Nov. 2, 1999

[54] COOKING APPARATUS

[76] Inventor: Renato Riccio, 11350 Pagemill, Dallas, Tex. 75243

[21] Appl. No.: 08/221,356

[22] Filed: Mar. 31, 1994

Related U.S. Application Data

[60] Division of application No. 07/964,024, Oct. 20, 1992, abandoned, which is a continuation-in-part of application No. 07/684,576, Apr. 12, 1991, Pat. No. 5,184,540.

[51] Int. Cl.$^6$ .................................................. A23L 1/025
[52] U.S. Cl. ..................... 99/339; 99/421 HH; 99/421 P; 99/447; 99/480; 99/482; 126/41 B; 126/290
[58] Field of Search .................................. 99/339, 34 D, 99/419, 421 R, 421 A, 421 H, 421 HH, 421 HV, 421 P, 447, 482, 480; 126/41 A, 41 B, 285 R, 290, 295

[56] References Cited

U.S. PATENT DOCUMENTS

| | | | |
|---|---|---|---|
| 1,964,372 | 6/1934 | Tygart | 99/482 |
| 2,182,225 | 12/1939 | Garvis | 99/421 H |
| 2,558,569 | 6/1951 | Koch | 126/41 B |
| 2,618,730 | 11/1952 | Panken | 99/421 H |
| 2,696,163 | 12/1954 | Galley | 99/421 P |
| 2,762,293 | 9/1956 | Bayajian | 99/421 P |
| 2,885,950 | 5/1959 | Stoll et al. | 99/421 P |
| 2,927,524 | 3/1960 | Luff | 99/421 H |
| 3,019,720 | 2/1962 | Topper | 99/421 H |
| 3,041,959 | 7/1962 | Oyler | 99/480 |
| 3,104,605 | 9/1963 | McKinney | 99/421 H |
| 3,125,015 | 3/1964 | Schlaegel | 99/421 P |
| 3,196,776 | 7/1965 | Norton | 99/421 P |
| 3,205,812 | 9/1965 | Booth | 99/421 P |
| 3,296,957 | 1/1967 | Gagnon et al. | 99/444 |
| 3,333,529 | 8/1967 | Wilson | 99/421 P |
| 3,782,268 | 1/1974 | Navarro | 99/421 P |
| 3,832,989 | 9/1974 | Belford | 126/25 R |
| 3,951,052 | 4/1976 | Ringo | 99/427 |
| 3,951,571 | 6/1976 | Decuir | 99/480 |
| 4,214,516 | 7/1980 | Friedl et al. | 99/421 P |
| 4,321,857 | 3/1982 | Best | 99/446 |
| 4,757,756 | 7/1988 | Van Marr | 99/482 |
| 4,951,648 | 8/1990 | Shukla et al. | 99/451 |
| 5,113,699 | 5/1992 | Soriana | 99/421 H |

FOREIGN PATENT DOCUMENTS

| | | | |
|---|---|---|---|
| 2477396 | 9/1981 | France | 99/419 |
| 2425346 | 12/1975 | Germany | 99/421 P |
| 21522566 | 12/1976 | Germany | 99/421 P |
| 0469456 | 2/1975 | U.S.S.R. | 99/421 P |
| 0908645 | 10/1962 | United Kingdom | 99/421 P |
| 1324986 | 7/1973 | United Kingdom | 99/421 P |

*Primary Examiner*—James F. Hook
*Attorney, Agent, or Firm*—Harry C. Post

[57] ABSTRACT

Cooking apparatus includes apparatus to support food to be cooked. A housing surrounds a portion of the support apparatus and defines a portal through which food may be passed into the housing. A fireplace is disposed in the housing to support a fire that produces heated gas for cooking food. The fireplace may include a solid fuel burning grate to support solid fuel used as a flavor enhancing substance to the food being cooked with the grate having a body with apertures through which hot coal is discharged. A hot coal supporting device is disposed beneath the grate to receive the hot coals discharged from the solid fuel burning grate and has a body with apertures through which ash is discharged. An ash bin is disposed beneath the hot coal supporting device to receive the discharged ash. A heated gas passageway is provided in the housing to place the heated gas in fluid communication with an environment outside of a building in which the housing is disposed. A browning plate reflects heat toward the supporting device and is disposed in the housing in heat transfer relation with the heated gas passageway. The gas flow through the heated gas passageway is regulated in response to the heat being emitted through the portal defined in the housing and in response to the heat being transferred to the browning plate. An infrared heating source may be disposed in the housing to provide infrared heat to food on the support.

15 Claims, 4 Drawing Sheets

COOKING APPARATUS

CROSS REFERENCE TO RELATED APPLICATION

This application is a division of application Ser. No. 07/964,024, filed on Oct. 20, 1992, of RENATO RICCIO, for COOKING APPARATUS now abandoned, which is a continuation-in-part of application Ser. No. 07/684,576, filed on Apr. 12, 1991, of RENATO RICCIO, for COOKING APPARATUS now U.S. Pat. No. 5,184,540.

TECHNICAL FIELD

This invention relates to a cooking apparatus and more particularly to a cooking apparatus embodying a rotisserie to cook food in restaurants, cafes, hotels and other commercial establishments, which have a demand for substantial quantities of cooked food.

BACKGROUND ART

It is well known that prior art cooking devices have cooked food, such as chickens, hams, beef and fish, in certain commercial establishments by using a fire in a hearth supporting a rotisserie.

Some of these prior art cooking devices use one or more spits that are rotated around an axis so that the food is cooked uniformly. In these prior art devices, gears are used to rotate each of the spits. Since gears are costly to manufacture and maintain, these prior art cooking devices are extremely expensive to make and service. Accordingly, only those commercial establishments with a large demand can justify the expense of this prior art device.

Further, these prior art cooking devices are commonly constructed without a door to allow rapid access into the cooking area of the cooking device. Because there is no door, it is common for the heat to pass through the opening into the dining area of the cafe or restaurant, which adversely effects the comfort level of the customers. Also, workers are adversely effected by the hot working conditions when this heat is not removed from the work area. Also, the removal of this heat from the dining and working areas is expensive and unnecessary.

Further, some of the prior art cooking apparatus embody a plate or heat reflecting device to brown or assist in cooking the food. This plate or heat reflecting device is commonly called a browning plate and is in the prior art cooking apparatus by passing the heated gas produced in the fireplace the surface of the plate facing the food being cooked. Since only one surface is being heated an extended period of time passes before the plate is heated to become effective. Accordingly, the heating of the browning plate in these prior art cooking apparatus is not as efficient as one would desire and efficient operation of these prior art cooking apparatus takes longer than one desires.

Further, to heat the browning plate to its effective temperature in the prior art cooking apparatus takes a substantial period of time. Until the browning plate is heated to its effective temperature, the prior art cooking apparatus is not as efficient as one would desire and energy is wasted or the finished food product does not appear as appetizing as one would desire.

Further, some of the prior art cooking apparatus have a fireplace to burn solid fuel for cooking the food and enhancing the flavor of the food and to burn fluid fuels, such as natural gas, propane gas, butane gas, oil or kerosene, for providing a constant heat source for cooking the food. It has been discovered, however, that in some emergencies, one of these fuels is not available even though electrical energy is. Accordingly, these prior art cooking apparatus are not functional in certain when one of these fuels is unavailable, such as occurs in emergencies.

Further, in some prior art cooking apparatus the remains, such as ashes, from the burned solids cannot be removed until such devices are cooled down. If a large demand for food from these prior art apparatus continues for a sufficiently extended period, the remains will require the prior art cooking device to be turned off before the demand is satisfied. When this occurs, heat energy is wasted and the cooking apparatus is not used economically.

Accordingly, it is an object of the present invention to provide cooking apparatus that prevents adding heat to a room in which the cooking apparatus is located.

Further, it is an object of the present invention to provide cooking apparatus that make uses of the fire produced in the fireplace more efficiently than prior art cooking apparatus.

Further, it is an object of the present invention to provide cooking apparatus that regulates heat removal from a housing into the environment surrounding the housing.

Further, it is an object of the present invention to provide cooking apparatus that directs heated gas across and transfers heat to a browning plate to maximize heating of such browning plate while minimizing the heat-up time before the browning plate may be used.

Further, it is an object of the present invention to provide cooking apparatus that provides an electrical infrared heat source to heat the food being cooked until a browning plate is heated to its effective temperature.

Further, it is an object of the present invention to provide cooking apparatus that provides an electrical infrared heat source to heat the food being cooked until a browning plate is heated to its effective temperature and then turned off to conserve electrical energy.

Further, it is an object of the present invention to provide cooking apparatus that provides a redundant system of heating from different energy sources so that the cooking apparatus may be used even though one energy source is unavailable.

Further, it is an object of the present invention to provide cooking apparatus that allows the removal of solids remaining after a solid fuel has been burned without a discontinuation of the cooking of food.

DISCLOSURE OF THE INVENTION

In accordance with the present invention there is provided cooking apparatus, which comprises supporting apparatus for supporting food to be cooked. A housing surrounds a portion of the supporting apparatus and defines a portal through which food may be passed to the supporting apparatus. A fireplace is disposed in the housing to support a fire that produces heated gas for cooking food. A heated gas passageway is provided in the housing to place the heated gas produced by the fire in the fireplace in fluid communication with an outside of the housing. The heated gas passageway has an inlet to receive the heated gas from the fire and the inlet is disposed in close juxtaposition with the portal.

Further, in accordance with the present invention there is provided a cooking apparatus, which comprises a supporting apparatus for supporting food to be cooked. A housing surrounds a portion of the supporting apparatus and defines a portal through which food may be passed to the supporting apparatus. A fireplace is disposed in the housing to support a fire that produces heated gas for cooking food. A heated gas passageway is provided in the housing to place the heated gas produced by the fire in the fireplace in fluid communication with the outside of the housing. A browning plate to reflect heat toward the supporting apparatus is disposed in the housing in heat transfer relation with the heated gas passageway. A control apparatus is connected to the housing for regulating the flow of gas through the heated gas passageway in response to the heat being emitted through the portal defined in the housing and in response to the heat being transferred to the browning plate.

Further, in accordance with the present invention there is provided cooking apparatus, which comprises supporting apparatus for supporting food to be cooked. A housing surrounds a portion of the supporting apparatus. A fireplace is disposed in the housing to support a fire that produces heated gas for cooking food. A heated gas passageway is provided in the housing to place the heated gas produced by the fire in the fireplace in fluid communication with the outside of the housing. The heated gas passageway has an inlet to receive the heated gas from the fire in the fireplace and a browning plate to reflect heat toward the supporting apparatus is connected to the housing. The browning plate includes a body having a browning surface facing the supporting apparatus and is disposed in the housing such that the heated gas produced by the fire in the fireplace passes across the browning surface and transfers heat to the browning plate body after passing through an inlet into the heated gas passageway.

Further, in accordance with the present invention there is provided cooking apparatus, which comprises supporting apparatus for supporting food to be cooked. A housing surrounds a portion of the supporting apparatus. A fireplace is disposed in the housing to support a fire that produces heated gas for cooking food on the supporting apparatus. The fireplace includes a solid fuel burning portion to produce heated gas for cooking food by burning a solid fuel and a fluid flee burning portion to produce heated gas for cooking food by burning a fluid fuel. An infrared heating source is disposed in the housing to provide infrared heat to food on the supporting apparatus.

Further, in accordance with the present invention there is provided cooking apparatus, which comprises supporting apparatus for supporting food to be cooked. A housing surrounds a portion of the supporting apparatus. A fireplace is disposed in the housing to support a fire that produces heated gas for cooking food on the supporting apparatus. The fireplace includes a solid fuel burning grate to support solid fuel that provides a fire fed by a flavor enhancing substance to provide a flavor to the food being cooked. The solid fuel burning grate has a body with apertures through which hot coal is discharged. A hot coal supporting apparatus is disposed beneath the grate to receive the hot coals discharged from the solid fuel burning grate. The hot coal supporting apparatus has a body with apertures through which ash is discharged. An ash bin is disposed beneath the hot coal supporting apparatus to receive the discharged ash.

BRIEF DESCRIPTION OF THE DRAWINGS

Other objects and advantages of the invention will become apparent upon reading the following detailed description and upon reference to the drawings, wherein like reference characters are used throughout to designate like parts.

BEST MODE FOR CARRYING OUT THE INVENTION

Figure 1:
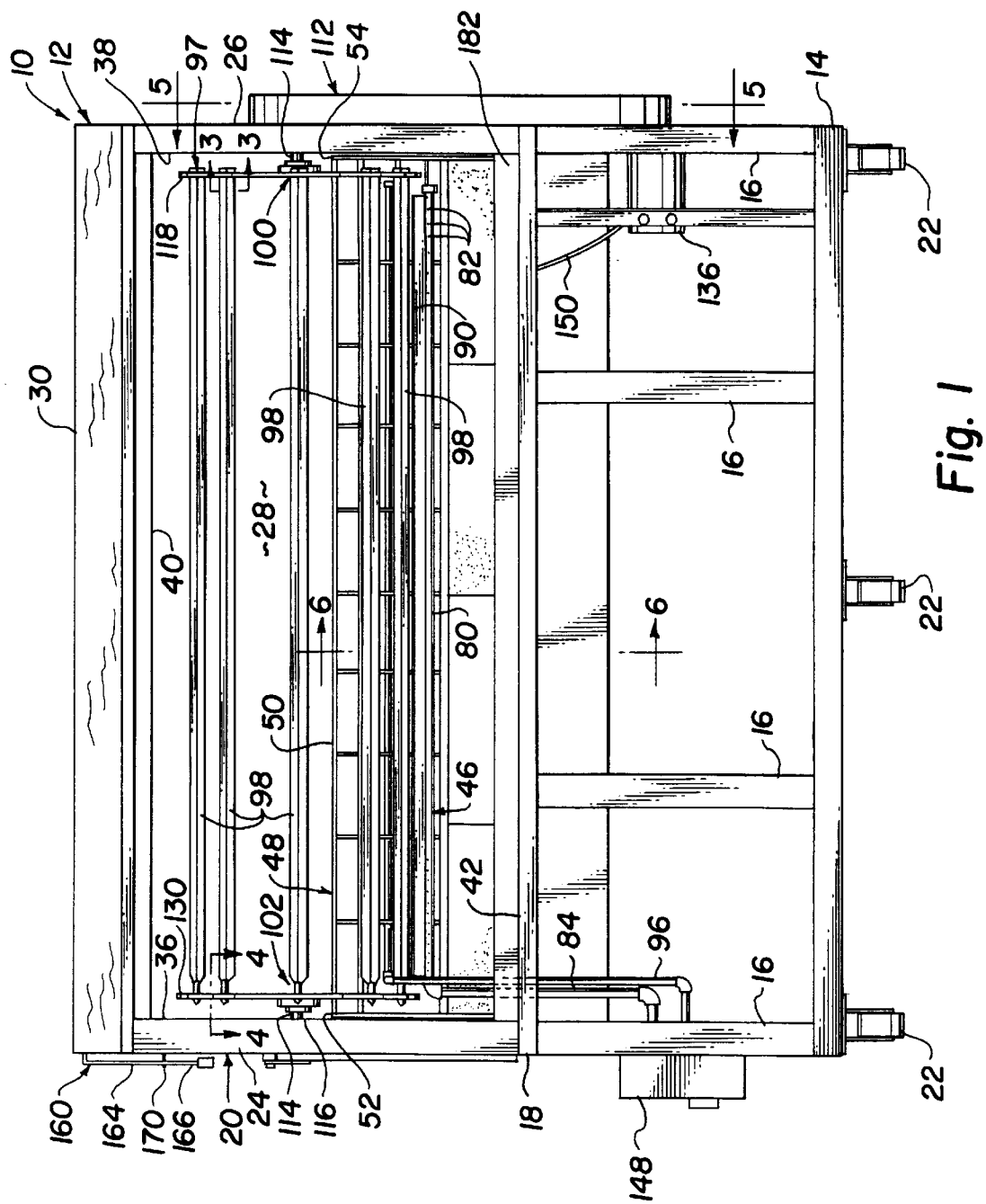
FIG. 1 is a front elevational view of cooking apparatus constructed in accordance with the present invention.
Figure 2:
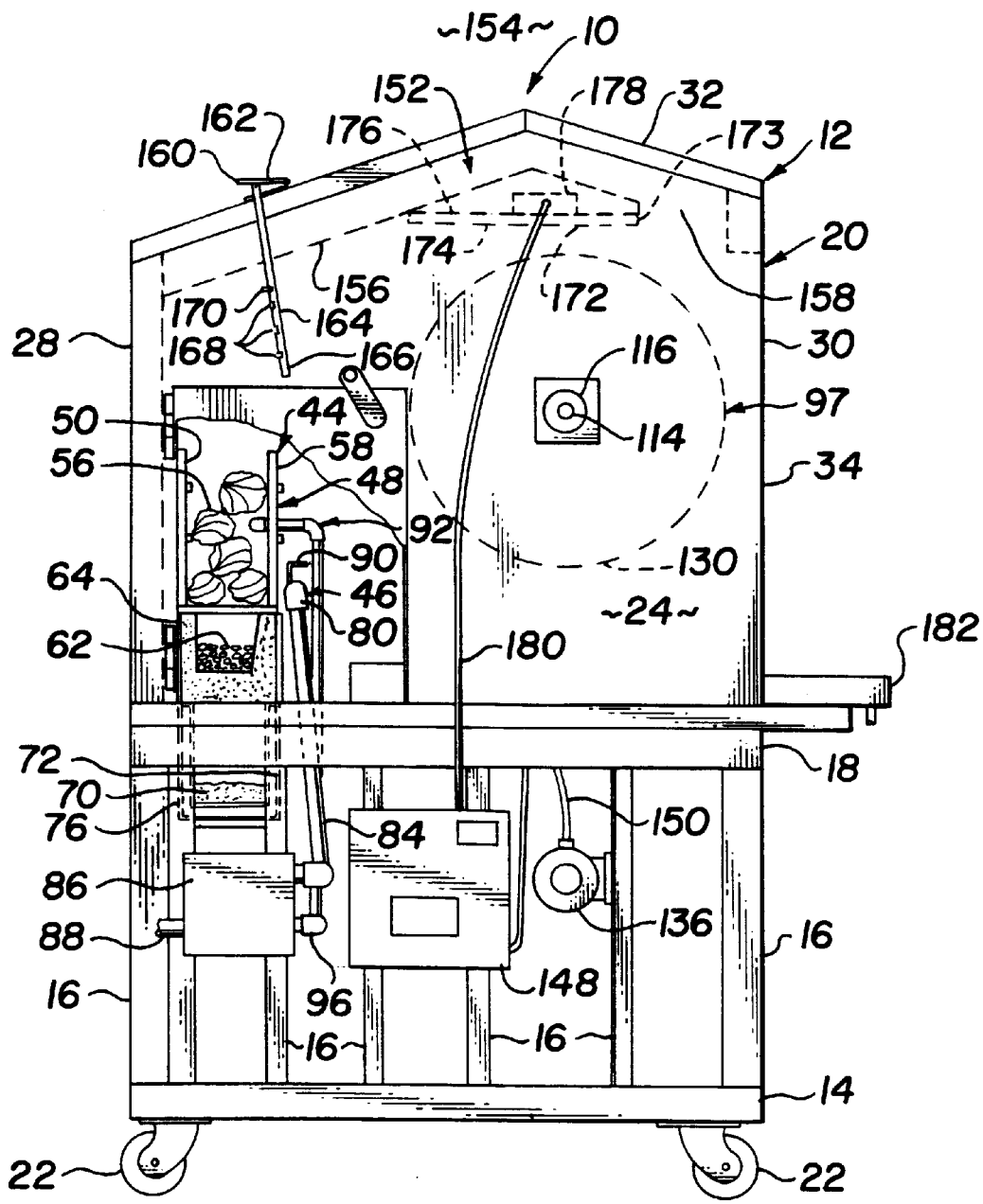
FIG. 2 is a left side elevational view, partly in section, of the cooking apparatus shown in FIG. 1.

Turning now to FIGS. 1 and 2, there is shown cooking apparatus 10, which comprises a housing 12.

Housing 12 is constructed from a metal frame with a bottom 14 from which a plurality of columns 16 extend upwardly to support a shelf 18 forming the bottom or floor of an enclosure 20. Wheels 22 are connected to the underneath side of bottom 14 in a conventional manner to enable housing 12 to be rolled over a substantially level surface to a desired location. Enclosure 20 has a left sidewall 24, a right sidewall 26, a back 28, a front 30 and a top 32. Front 30 is open for access into enclosure 20 and a portal 34 through which food may be passed is defined by the interior surface 36 of left sidewall 24, the interior surface 38 of right sidewall 26, the interior surface 40 of top 32 and interior surface 42 of shelf 18.

A fireplace 44 to support a fire for cooking food is provided in enclosure 20. The fire in fireplace 44 is provided by fluid fuel burning apparatus 46 and solid fuel burning means 48. Fluid, preferably gas, fuel burning apparatus 46 provides substantially constant heat to the food being cooked and solid fuel burning apparatus 48 provides a flavor enhancement to the food being cooked, as well as heat to the food being cooked.

As best seen in FIGS. 1, 2, 6, and 7, solid fuel burning apparatus 48 includes a metal frame or grate 50 extending from a first end 52 disposed adjacent to left side wall 24 of enclosure 20 to a second end 54 disposed adjacent to right side wall 26 of enclosure 20.

Grate 50 is made of metal to form an elongated lattice work that is capable of supporting solid fuel 56, such as hickory or mesquite wood, which, when burned, provides a fire fed by a flavor enhancing substance to provide a flavor to the food being cooked, as well as provide heat for cooking the food. Solid fuel burning grate 50 has a body 58 with a plurality of apertures 60 through which hot coal 62 is discharged. Apertures 60 in body 58 of solid fuel burning grate 50 are sufficiently large to retain burning solid fuel 56 and sufficiently small to allow hot coals 62 to pass into a hot coal supporting apparatus 64.

Hot coal supporting apparatus 64 is made from a refractory material, such as cement, and disposed beneath grate 50 to receive hot coals 62 discharged from solid fuel burning grate 50. Hot coal supporting apparatus 64 has a body 66 with a plurality of apertures 68 through which ash 70 is discharged. Apertures 68 in body 66 of hot coal supporting apparatus 64 are sufficiently large to retain coal 62 and sufficiently small to allow ashes 70 to pass into ash bin 72.

Ash bin 72 is disposed beneath hot coal supporting apparatus 64 to receive the discharged ash 70. Ash bin 72 includes a body 74 is an open ended elongated trough with a cross-sectional appearance of a "U". A portion of body 74 is positioned beneath shelf 18 to provide access to ashes 70 such that access through the open end is permitted to remove ashes 70 from enclosure 20 of housing 12 while a fire exists during the burning of solid fuel 56 in solid fuel burning grate 50. Disposed around body 74 is a shield 76 to assist in preventing injury to a worker using cooking apparatus 10. Shield 76 is fastened in a conventional manner to a lip 78 provided on each side of body 74 and displaced from the trough of body 74 by a distance sufficient to reduce heat transfer from body 74 to shield 76.

As best seen in FIGS. 1 and 2, fluid fuel burning apparatus 46 has an elongated burner 80 that extends substantially parallel to and adjacent with elongated solid fuel burning apparatus 48 on the side away from wall 28 of housing 12. Burner 80 is a tubular member with perforations 82 along its length to permit the fluid fuel to escape from the member and be burned. Attached to burner 80 is tubular member 84 connected into a control valve enclosed in a control box 86 supported on one of columns 16 of housing 12. An inlet connection 88 is provided for direct connection to a commercial source of a fluid fuel.

To direct the fire toward the food being cooked, an elongated angle iron 90 has one side of the angle attached to tubular member 80 and the other side of the angle facing away from back wall 28 to direct the fire away from solid fuel burning apparatus 48.

A solid fuel fire starter 92 is used to start and maintain constant burning of solid fuel 56. Starter 92 has an elongated tubular member 94 with apertures provided therein extending along grate 50 in close juxtaposition with solid fuel 56 so that a flame from member 94 contacts fuel 56. Tubular member 94 is connected through pipe 96 to a valve in control box 86 to place inlet connection 88 in fluid communication with fire starter 92.

A multiplicity of spits 98 for supporting food in food supporting apparatus 97 are rotatably connected to housing 12 and disposed to receive heat generated from the fire in fireplace 44 formed by fluid fuel burning apparatus 46 and solid fuel burning apparatus 48.

Each spit 98 has an elongated body 99 extending from a first end 100 to a second end 102.

Figure 3:
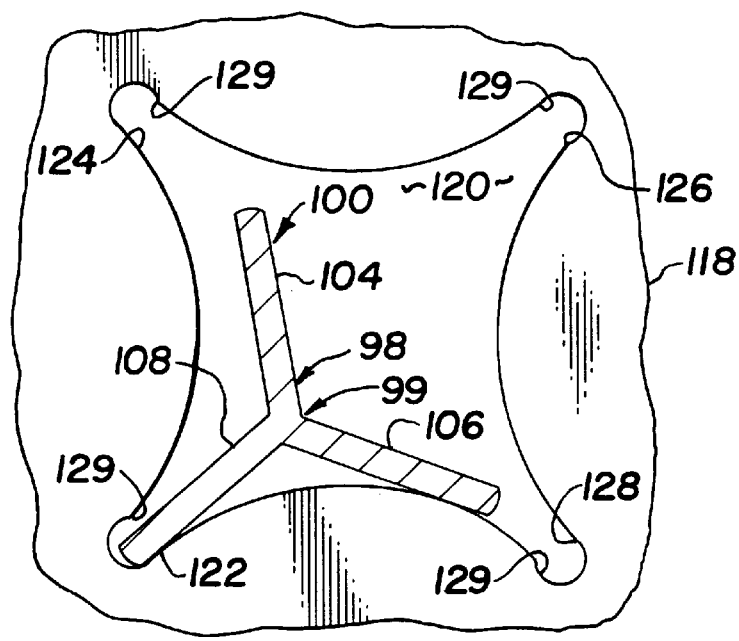
FIG. 3 is a sectional view of a portion of the invention shown in FIG. 1 taken along line 3—3 in the direction of the arrows.

As best seen in FIGS. 1 and 3, first end 100 of each spit 98 has at least three driven shoulders 104, 106 and 108 disposed along body 99 of each spit 98 substantially equidistant from one another around the periphery of spit 98. Driven shoulders 104, 106 and 108 are formed by radially directed fins extending along body 99 substantially the entire length of the respective spit to provide stability along the length of spit 98 and allow substantial amounts of food to be connected to each spit 98 without damage to the spits when rotated.

Figure 4:
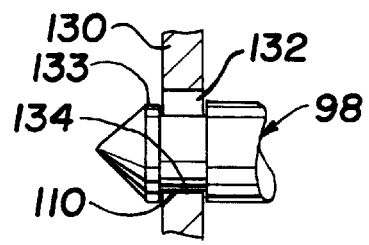
FIG. 4 is a sectional view of a portion of the invention shown in FIG. 1 taken along line 4—4 in the direction of the arrows.

As best seen in FIGS. 1 and 4, second end 102 of each spit 98 has a bearing surface 110 to support each spit 98 in a generally horizontal manner, while allowing the respective spit to rotate relative to the surface supporting the respective spit.

Connected to housing 12 is a driving apparatus 112 for rotating the multiplicity of spits 98. Driving apparatus 112 includes a two piece axle rod 114 that is rotatably connected to housing 12, such as by bearings 116, and a drive member 118 connected to axle rod 114.

As best seen in FIG. 3, drive member 118 has a passageway 120 for each spit 98. Passageway 120 is of sufficient size to receive first end 100 of the respective spit while being sufficiently small to prevent spit 98 from bouncing out of drive member 118 when rotated around axle 114. Passageway 120 defines at least four driving shoulders 122, 124, 126 and 128. Each driving shoulder is gently curved to prevent the spit from bouncing as drive member 118 is rotated and is provided with a retaining shoulder 129 to assist in preventing spit 98 from rotating more than one driven shoulder at a time. Also, each driving shoulder is disposed substantially equidistant from one another and engage driven shoulders 104, 106 and 108 on the respective spit so that each spit 98 rotates more than one complete revolution every time drive member 118 is rotated around axle 114. Although only four driving shoulders 122, 124, 126 and 128 and three driven shoulders 104, 106 and 108 are discussed and shown, it should be understood that multiples of four driving and three driven shoulders will operate equally well to rotate each spit 98 at a different rate of rotation than the rotation of axle rod 114.

As best seen in FIG. 4, a support member 130 is rotatably connected to axle 114, and has a passageway 132 for each spit 98. Each passageway 132 is of sufficient size to permit head 133 of second end 112 of the respective spit to pass therethrough while sufficiently small to inhibit the likelihood of second end 112 from disengaging with support member 130 as support member 130 rotates around axle 114. Each passageway 132 includes a bearing surface 134 to engage bearing surface 110 on the respective spit so that the respective spit is permitted to rotate relative to support member 130 when the spit is moving around axle rod 114.

Figure 5:
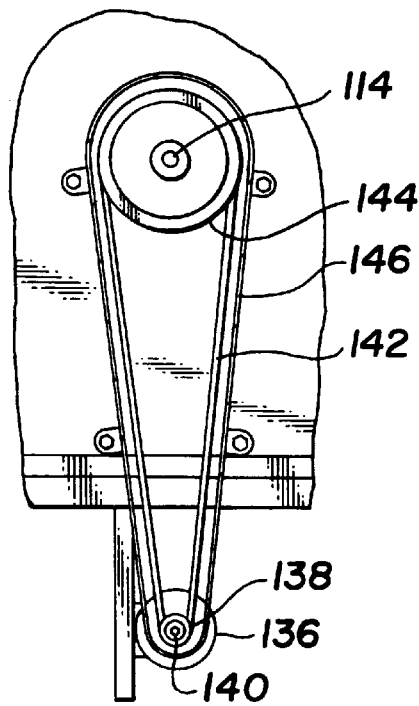
FIG. 5 is a sectional view of a portion of the invention shown in FIG. 2, taken along line 5—5 in the direction of the arrows.
Figure 6:
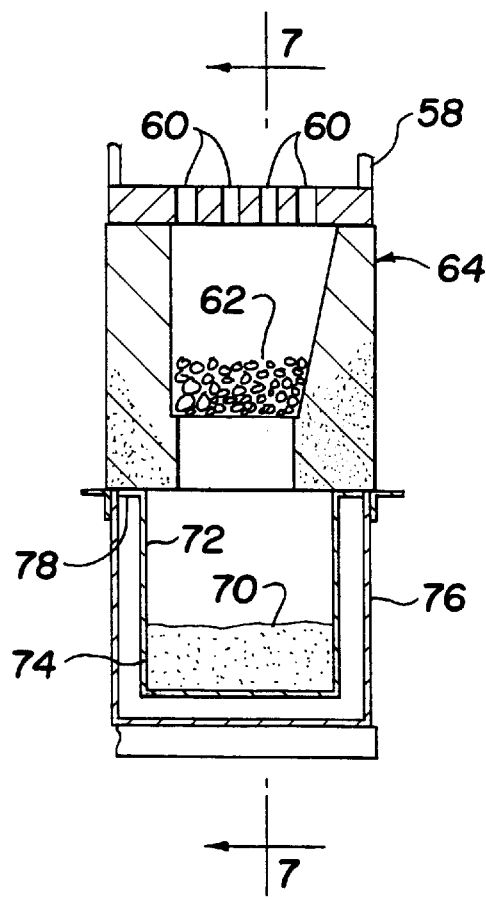
FIG. 6 is a sectional view of a portion of the invention shown in FIG. 1 taken along line 6—6 in the direction of the arrows.
Figure 7:
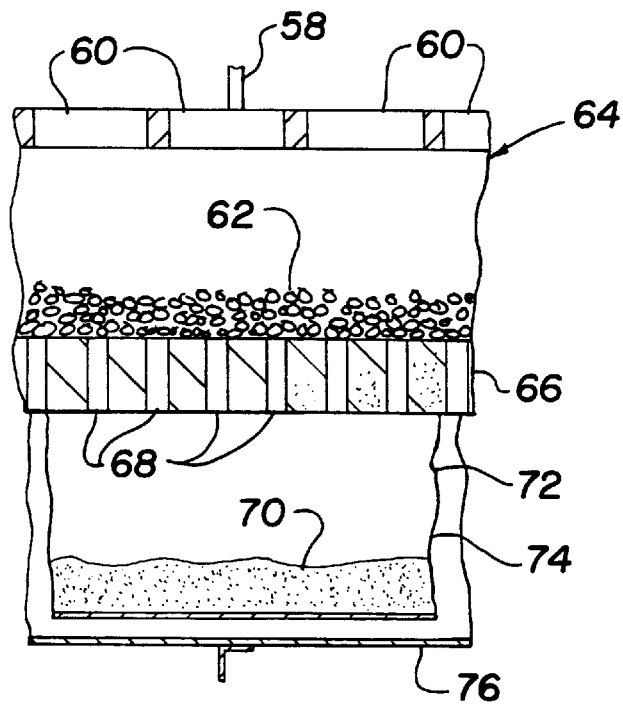
FIG. 7 is a sectional view of a portion of the invention shown in FIG. 6 taken along line 7—7 in the direction of the arrows.

As best seen in FIGS. 1, 2 and 5, to rotate drive member 118 around axle rod 114, an electric motor 136 is connected to one of the columns 16. A pulley 138 is connected to a drive shaft 140 of motor 136 and drives a drive belt 142. A pulley 144 is connected to axle rod 114 and operably engages with drive belt 142 to rotate drive member 118 and support member 130 around axle 114, while simultaneously rotating each spit 98 to rotate while being moved around axle 114. To inhibit the likelihood of injury to workers, a cover 146 is connected to housing 12.

Electrical control circuitry is disposed in control box 148 and used to control electrical operations of cooking apparatus 10. Control box 148 includes computerized electronic control chips to selectively activate motor 136 through conductor 150 and perform other operations for the cooking apparatus; such as, activating fluid fuel burning apparatus 46 and solid fuel fire starter 92.

A heated gas passageway 152 is provided near top 32 and inside housing 12 to place the heated gas produced by the fire in fireplace 44 in fluid communication with the exterior or outside 154 of housing 12. A partition 156 extends substantially parallel to roof 32 between and connected to sides 24 and 26 of enclosure 20 to form heated gas passageway 152. An opening to form an inlet 158 into heated gas passageway 152 is defined in partition 156. Inlet 158 is defined in partition 156 in close juxtaposition with portal 34 to permit easy access of the gases heated by the fire in fireplace 44 to pass generally parallel to and up back 28 and along partition 156 into inlet 158 of heated gas passageway 152.

Control means 160 is connected to housing 12 for regulating the flow of gas through heated gas passageway 152 in response to the heat being emitted through portal 34 defined in housing 12. Control means 160 includes an exhaust louver 162 pivotally connected in a conventional hinged manner to roof 32 of housing 12 and regulating means 164 for moving exhaust louver 162 toward an opened position to increase removal of heat from housing 12 in response to heat being emitted through portal 34. Regulating means 164 has a rod 166 pivotally connected to a side of louver 162 that extends down left side wall 24. Notches 168 are provided along the side of rod 166 to engage with latch member 170 attached to the exterior of left side wall 24 of housing 12. By moving rod 166 upwardly of roof 32, exhaust louver 162 is moved toward an opened position to increase removal of heat from housing 12 in response to heat being emitted through portal 34.

When cooking apparatus 10 is disposed within a building, a conventional exhaust system is provided around exhaust louver 162 to exhaust the heated gas from heated gas passageway 152 outwardly of the building.

As best seen in FIGS. 1 and 2, a heat reflecting device or browning plate 172 to provide heat to the food being cooked at a location remote from fireplace 44 is connected to partition 156 of housing 12. Browning plate 172 has a body 173 made of a heat absorbing metal that is heated by latent heat transferred from the heated cooking gas prior to the heated gas leaving housing 12. Body 173 of browning plate 172 is positioned in partition 156 to reflect heat toward food supporting apparatus 97 and is disposed in partition 156 of housing 12 in heat transfer relation with heated gas passageway 152. This positioning of browning plate 172 allows heated gas from fireplace 44 to pass across a browning surface 174 of browning plate 172 that faces food support apparatus 97 and to receive heat transferred from the heated gas passing through heated gas passageway 152 to an opposite surface 176 of browning plate 172 that faces away from food support apparatus 97.

Control means 160 may be used to increase the transfer of heat to browning plate 172, exhaust louver 162 is moved by rod 166 toward a closed position, and to increase removal of heat from housing 12 in response to heat being emitted through the portal 34, exhaust louver 162 is moved by rod 166 toward an opened position. Thus, control means 160 regulates the flow of gas through heated gas passageway 152 in response to the heat being transferred to browning plate 12 as well as to the heat being emitted through portal 34 defined in housing 12.

A conventional infrared heating source 178 for providing infrared heat to food on supporting apparatus 97 is disposed in partition 156 provided in housing 12. An opening is provided through browning plate 172 so that infrared heat produced by infrared heating source 178 contacts the food being cooked. Infrared heating source 178 is used to provide heat to cook food should solid fuel and fluid fuel not be available and to provide heat to cook food before browning plate 172 has reached operating temperature to thereby decrease the time required for the initial production of cooked food.

A conductor 180 connects infrared heating source 178 to the electric control circuitry in control box 148 so as to receive electrical power and to inactivate infrared heating source 178 after browning plate 172 reaches a chosen temperature.

A reclamation trap 182 is disposed beneath the multiplicity of spits 98 to recover the juices produced when cooking the food, as explained in application Ser. No. 07/684,576.

In operation, solid fuel burning apparatus 48 is loaded with solid fuel 56, fluid fuel burning apparatus 46 and solid fuel fire starter 92 ignited and infrared heating source 178 activated. Water is added to reclamation trap 182. Motor 136 is turned off and a spit 98 removed from driving apparatus 112. Food to be cooked is attached to spit 98 and each spit 98 reconnected to driving apparatus 112. After the quantity of food desired to be cooked has been attached to the multiplicity of spits 98, motor 136 is energized and drive members 118, support members 130 and spits 98 rotated around axle 114 until the food is cooked. Following the cooking of this food, additional food may replace the cooked food on the spits and additional cooking take place until it is desired to discontinue cooking, at which time motor 136 and solid fuel fire starter 92 and fluid fuel burning apparatus 34 are turned off. Sometime during the continuous cooking operation, infrared cooking source 172 is inactivated by the electrical control circuitry in control box 148 after browning plate 172 has reached its operating temperature. Also, should it be necessary to eliminate an accumulation of ash 70, this accumulated ash is removed without interrupting the continuous cooking operation by removing such ash through the open end of ash bin 72.

In the event that solid fuel 56 is unavailable, food may be cooked by igniting fluid fuel cooking apparatus 46, activating infrared heating source 178, mounting the food onto spits 98 as previously described and cooking the food.

In the event that fluid fuel is unavailable, food may be cooked by placing solid fuel 56 in fireplace 44, igniting solid fuel 56 by use of matches in a conventional manner, activating infrared heating source 178, mounting the food onto spits 98 as previously described and cooking the food.

The invention having been described, what is claimed is:

1. Cooking apparatus, comprising: supporting means for supporting food to be cooked; a housing surrounding a portion of said supporting means; a fireplace disposed in said housing to support a fire that produces heated gas for cooking food on said supporting means, said fireplace including a solid fuel burning portion to produce heated gas for cooking food by burning a solid fuel and a fluid fuel burning portion to produce heated gas for cooking food by burning a fluid fuel; and an infrared heating source disposed in said housing to provide infrared heat to food on said supporting means.

2. Cooking apparatus, as set forth in claim 1, further comprising: said supporting means including a spit for supporting food disposed to receive heat generated from the fire in the fireplace, said spit including at least three driven shoulders disposed around the periphery of the spit.

3. Cooking apparatus as set forth in claim 2, further comprising: said supporting means further including the three driven shoulders on said spit being formed by radially directed fins extending substantially the entire length of the spit to provide stability along its length and thereby allow substantial amounts of food to be connected to the spit.

4. Cooking apparatus as set forth in claim 2, further comprising: said supporting means further including the spit rotatably connected to said housing and including the three driven shoulders disposed substantially equidistant from one another.

5. Cooking apparatus, as set forth in claim 2, further comprising: driving means connected to said housing for rotating the spit; and a drive member including a shoulder to engage the driven shoulders on the spit so that the spit is rotated relative to the drive member.

6. Cooking apparatus, as set forth in claim 5, further comprising: said driving member including at least four driving shoulders disposed substantially equidistant from one another.

7. Cooking apparatus, as set forth in claim 6, further comprising: said driving means further including an electric motor adapted to provide the rotating force to the driving member and thereby rotate the spit.

8. Cooking apparatus, comprising: supporting means for supporting food to be cooked; a housing surrounding a portion of said supporting means; a fireplace disposed in said housing to support a fire that produces heated gas for cooking food on said supporting means, said fireplace including a solid fuel burning portion to produce heated gas for cooking food by burning a solid fuel and a fluid fuel burning portion to produce heated gas for cooking food by burning a fluid fuel; an infrared heating source disposed in said housing to provide infrared heat to food on said supporting means; a browning plate to reflect heat toward said supporting means disposed in said housing; and control means for inactivating said infrared heating means after said browning plate reaches a chosen temperature.

9. Cooking apparatus, as set forth in claim 8, further comprising: said browning plate including a body having a browning surface facing said supporting means and being disposed in said housing such that the heated gas produced by the fire in the fireplace passes across the browning surface and transfers heat to the browning plate body after passing through an inlet into the heated gas passageway.

10. Cooking apparatus, as set forth in claim 8, further comprising: said housing including a roof, a floor, a plurality of sides interconnecting the roof and floor, one of the sides defining a portal, and a partition extending substantially parallel to the roof between the sides to form a heated gas passageway and defining an opening to form an inlet into the heated gas passageway.

11. Cooking apparatus, comprising: supporting means for supporting food to be cooked; a housing surrounding a portion of said supporting means; and a fireplace disposed in said housing to support a fire that produces heated gas for cooking food on said supporting means, said fireplace including solid fuel burning grate to support solid fuel that provides a flavor to the food being cooked, the solid fuel burning grate having a body with apertures through which hot coal is discharged, a hot coal supporting apparatus disposed beneath the grate to receive the hot coals discharged from the solid fuel burning grate, the hot coal supporting apparatus having a body with apertures through which ash is discharged, and an ash bin disposed beneath the hot coal supporting apparatus to receive the discharged ash, the apertures in the body of said solid fuel burning grate being sufficiently large to retain burning solid fuel and sufficiently small to allow hot coals to pass into the hot coal supporting apparatus, and the apertures in the body of said hot coal supporting apparatus being sufficiently large to retain coals and sufficiently small to allow ashes to pass into the ash bin.

12. Cooking apparatus, comprising: supporting means for supporting food to be cooked; a housing surrounding a portion of said supporting means; and a fireplace disposed in said housing to support a fire that produces heated gas for cooking food on said supporting means, said fireplace including solid fuel burning grate to support solid fuel that provides a flavor to the food being cooked, the solid fuel burning grate having a body with apertures through which hot coal is discharged, a hot coal supporting apparatus disposed beneath the grate to receive the hot coals discharged from the solid fuel burning grate, the hot coal supporting apparatus having a body with apertures through which ash is discharged, and an ash bin disposed beneath the hot coal supporting apparatus to receive the discharged ash, said supporting means including a spit for supporting food disposed to receive heat generated from the fire in the fireplace, said spit including at least three driven shoulders disposed around the periphery of the spit, said supporting means further including the three driven shoulders on said spit being formed by radially directed fins extending substantially the entire length of the spit to provide stability along its length and thereby allow substantial amounts of food to be connected to the spit.

13. Cooking apparatus, comprising: supporting means for supporting food to be cooked; a housing surrounding a portion of said supporting means; and a fireplace disposed in said housing to support a fire that produces heated gas for cooking food on said supporting means, said fireplace including solid fuel burning grate to support solid fuel that provides a flavor to the food being cooked, the solid fuel burning grate having a body with apertures through which hot coal is discharged, a hot coal supporting apparatus disposed beneath the grate to receive the hot coals discharged from the solid fuel burning grate, the hot coal supporting apparatus having a body with apertures through which ash is discharged, and an ash bin disposed beneath the hot coal supporting apparatus to receive the discharged ash, said housing including a roof, a floor, a plurality of sides interconnecting the roof and floor, one of the sides defining the portal, and a partition extending substantially parallel to the roof between the sides to form a heated gas passageway and defining an opening to form an inlet into the heated gas passageway.

14. Cooking apparatus, as set forth in claim 13, further comprising: a browning plate including a body having a browning surface facing said supporting means and being disposed in said housing such that the heated gas produced by a fire in the fireplace passes across the browning surface and transfers heat to the browning plate body after passing through the inlet into the heated gas passageway.

15. Cooking apparatus comprising: supporting means for supporting food to be cooked; a housing surrounding a portion of said supporting means; and a fireplace disposed in said housing to support a fire that produces heated gas for cooking food on said supporting means, said fireplace including solid fuel burning grate to support solid fuel that provides a flavor to the food being cooked, the solid fuel burning grate having a body with apertures through which hot coal is discharged, a hot coal supporting apparatus disposed beneath the grate to receive the hot coals discharged from the solid fuel burning grate, the hot coal supporting apparatus having a body with apertures through which ash is discharged, and an ash bin disposed beneath the hot coal supporting apparatus to receive the discharged ash, the ash bin including a body having an open end through which ashes may be removed from said housing while a fire exists from the solid fuel being burned in the solid fuel burning grate.

* * * * *